US012641402B2

(12) United States Patent
Balmakhtar et al.

(10) Patent No.: US 12,641,402 B2
(45) Date of Patent: May 26, 2026

(54) USER EQUIPMENT (UE) SERVICE OVER A NETWORK EXPOSURE FUNCTION (NEF) IN A WIRELESS COMMUNICATION NETWORK

(71) Applicant: T-MOBILE INNOVATIONS LLC, Overland Park, KS (US)

(72) Inventors: Marouane Balmakhtar, Fairfax, VA (US); Lyle T. Bertz, Lee's Summit, MO (US); Robert Keith Butler, Overland Park, KS (US); Mark Richard Bales, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 11 days.

(21) Appl. No.: 18/603,919

(22) Filed: Mar. 13, 2024

(65) Prior Publication Data

US 2024/0214791 A1 Jun. 27, 2024

Related U.S. Application Data

(63) Continuation of application No. 17/323,197, filed on May 18, 2021, now Pat. No. 11,956,702.

(51) Int. Cl.
| | |
|---|---|
| *H04W 36/00* | (2009.01) |
| *H04W 4/50* | (2018.01) |
| *H04W 4/60* | (2018.01) |
| *H04W 8/24* | (2009.01) |
| *H04W 48/18* | (2009.01) |

(52) U.S. Cl.
CPC ............... *H04W 4/50* (2018.02); *H04W 4/60* (2018.02); *H04W 8/24* (2013.01); *H04W 36/00226* (2023.05); *H04W 48/18* (2013.01)

(58) Field of Classification Search
CPC .......... H04W 4/50; H04W 4/60; H04W 8/24; H04W 36/00226; H04W 48/18; H04W 8/10; H04W 88/14; H04L 67/50; Y02D 30/70
See application file for complete search history.

(56) References Cited

U.S. PATENT DOCUMENTS

| | | | |
|---|---|---|---|
| 10,299,128 | B1 | 5/2019 | Suthar et al. |
| 10,462,840 | B2 | 10/2019 | Dao et al. |
| 10,791,508 | B2 | 9/2020 | Park et al. |

(Continued)

FOREIGN PATENT DOCUMENTS

| | | | | |
|---|---|---|---|---|
| EP | 3429129 A1 * | 1/2019 | ............. | H04W 4/60 |
| WO | 2018232253 A1 | 12/2018 | | |

(Continued)

*Primary Examiner* — Joseph E Dean, Jr.

(57) ABSTRACT

A data communication system authenticates a User Equipment (UE). The data communication system exposes the authenticated UE to a user data system over a Network Exposure Function (NEF) in response to the authentication. The data communication system receives, from the user data system, a request for user data from the authenticated UE over the NEF in response to the exposure. The data communication system receives the user data from the authenticated UE via the NEF. The NEF transfers the user data from the data communication system for delivery to the user data system in response to the request.

20 Claims, 11 Drawing Sheets

(56)  References Cited

U.S. PATENT DOCUMENTS

| | | | |
|---|---|---|---|
| 10,856,265 B2 | 12/2020 | Ryu | |
| 10,863,494 B2 | 12/2020 | Zhang et al. | |
| 2018/0192471 A1* | 7/2018 | Li | H04W 80/10 |
| 2019/0021064 A1 | 1/2019 | Ryu et al. | |
| 2019/0174449 A1 | 6/2019 | Shan et al. | |
| 2020/0252900 A1 | 8/2020 | Kim et al. | |
| 2020/0344576 A1* | 10/2020 | Li | H04W 4/06 |

FOREIGN PATENT DOCUMENTS

| | | | | |
|---|---|---|---|---|
| WO | 2019139118 A1 | 7/2019 | | |
| WO | WO-2019136128 A1 * | 7/2019 | | H04W 72/30 |
| WO | 2019223638 A1 | 11/2019 | | |
| WO | 2021057969 A1 | 4/2021 | | |

* cited by examiner

201

NON-3GPP IWF 112 RECEIVES NEF API CALLS FROM UE 101 OVER NON-3GPP ACCESS NODE 111.

202

NON-3GPP IWF 112 TRANSFERS THE NEF API CALLS THAT HAVE THE UE DATA TO 3GPP NEF 113.

203

3GPP NEF 113 RECEIVES THE NEF API CALLS THAT HAVE THE UE DATA FROM NON-3GPP IWF 112.

204

IN RESPONSE TO THE NEF API CALLS, 3GPP NEF 113 EXPOSES THE UE DATA TO AF 114.

205

AF 114 TRANSFERS THE UE DATA TO EXTERNAL DATA SYSTEMS.

400

WIRELESS NETWORK CORE 800

VNFS 805

IWF 814   NEF 818   AMF 815   SMF 816   NEF 818   UPF 817   AF 819

NFVI VIRTUAL LAYER 804 vNIC   vCPU   vRAM   vDRIVE   vSW

NFVI OPERATING SYSTEMS 803

KERNEL   MODULE   APPLICATION   CONTAINER   HYPERVISOR

NFVI HARDWARE DRIVERS 802

NIC   CPU   RAM   DRIVE   SW

NFVI HARDWARE 801

NIC   CPU   RAM   DRIVE   SW

WIFI AN 411   ENET AN 412   5GNR gNODEB 413   AS 402

USER EQUIPMENT (UE) SERVICE OVER A NETWORK EXPOSURE FUNCTION (NEF) IN A WIRELESS COMMUNICATION NETWORK

RELATED CASES

This United States Patent Application is a continuation of U.S. patent application Ser. No. 17/323,197 that was filed on May 18, 2021 and is entitled "USER EQUIPMENT (UE) SERVICE OVER A NETWORK EXPOSURE FUNCTION (NEF) IN A WIRELESS COMMUNICATION NETWORK." of U.S. patent application Ser. No. 17/323,197 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smart-phone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Interworking Functions (IWFs), Access and Mobility Management Functions (AMFs), Session Management Functions (SMFs), User Plane Functions (UPFs), Network Exposure Functions (NEFs), Application Functions (AFs), and the like.

The NEFs communicate with the other network elements to expose events and implement network capabilities. The NEFs and the AFs have an Application Programming Interface (API) framework to control the exposure of the events and the implementation of the network capabilities. The AFs are linked to external Application Servers (AS) that subscribe to the exposed events and services capabilities. The AS is often operated by a large operator that uses the AF and NEF to control services for a multitude of their affiliated wireless user devices. The NEF API calls from the AF allow the external AS to perform UE monitoring, device triggering, background data transfer, parameter provisioning, packet flow description management, traffic influence, chargeable party control, and NEF session quality. Unfortunately, the wireless user devices do not effectively interact with the NEF. Moreover, the wireless communication networks do not efficiently use secure network links to support the interaction between the wireless user devices and the NEFs.

TECHNICAL OVERVIEW

In some examples, user data is received from a user communication device that is associated with a user server.

The user data is transferred to a Network Exposure Function (NEF). The NEF transfers the user data for delivery to the user server.

In some examples, a User Equipment (UE) is authenticated. The authenticated UE is exposed to a user data system in response to the authentication. A request for user data from the authenticated UE is received from the user data system in response to the exposure. The user data is received from the authenticated UE. The user data is transferred for delivery to the user data system in response to the request.

In some examples, a data communication system comprises an Access and Mobility Management Function (AMF) and a Network Exposure Function (NEF). The AMF receives user data from a user communication device that is associated with a user server. The AMF transfers the user data to the NEF. The NEF transfers the user data for delivery to the user server.

DETAILED DESCRIPTION

Figure 1:
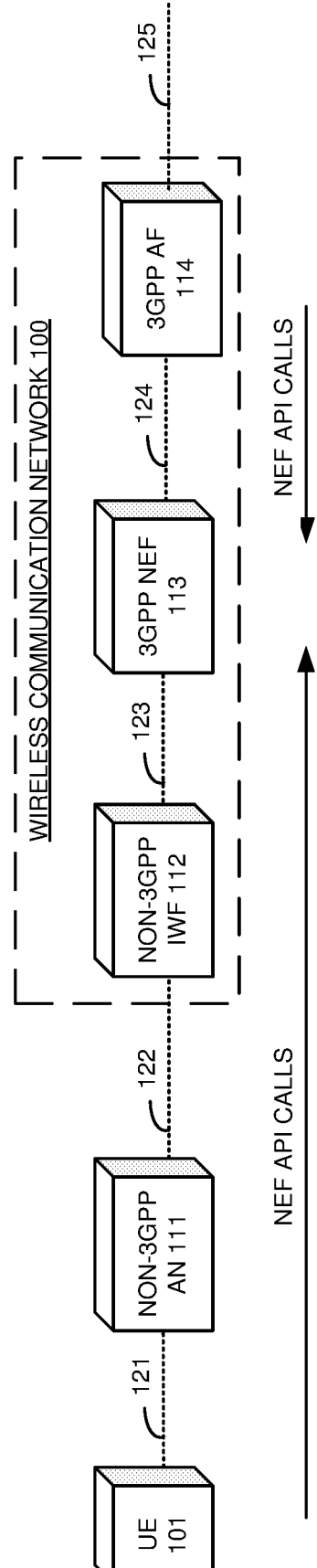
FIG. 1 illustrates a wireless communication network that serves User Equipment (UEs) over a Third Generation Partnership Project (3GPP) Network Exposure Function (NEF).

FIG. 1 illustrates wireless communication network 100 that serves User Equipment (UE) 101 over Third Generation Partnership Project (3GPP) Network Exposure Function (NEF) 113. UE 101 comprises a computer, phone, vehicle, sensor, robot, or some other data appliance with data communication circuitry. Wireless communication network 100 comprises non-3GPP Interworking Function (IWF) 112, 3GPP NEF 113, and 3GPP Application Function (AF) 114. UE 101 is linked to non-3GPP IWF 112 over non-3GPP Access Node (AN) 111. Additional network functions like Access and Mobility Management Function (AMF), Session Management Function (SMF), and User Plane Function (UPF) are typically present but are omitted for clarity.

Wireless communication network 100 is simplified and typically includes more UEs, access nodes, IWFs, NEFs, and AFs than shown.

Various examples of network operation and configuration are described herein. In some examples, UE 101 generates and transfers NEF Application Programming Interface (API) calls that have UE data to non-3GPP IWF 112 over non-3GPP AN 111. Non-3GPP IWF 112 receives the NEF API calls from UE 101 over non-3GPP AN 111. Non-3GPP IWF 112 transfers the NEF API calls that have the UE data to 3GPP NEF 113. Non-3GPP NEF 113 receives the NEF API calls that have the UE data from non-3GPP IWF 112. NEF 114 also receives NEF API calls from AF 114. In response to the NEF API calls from UE 101 and AF 114, 3GPP NEF 113 exposes the UE data to AF 114. AF 114 may transfer the UE data to external data systems like application servers.

In some examples, non-3GPP IWF 113 transfers the NEF API calls to 3GPP NEF 114 over a direct IWF-to-NEF link. In other examples, non-3GPP IWF 113 transfers the NEF API calls to 3GPP NEF 114 over a 3GPP Access and Mobility Management Function (AMF) and possibly over a 3GPP Session Management Function (SMF). In yet other examples, non-3GPP IWF 113 transfers the NEF API calls to 3GPP NEF 114 over a 3GPP User Plane Function (UPF). UE 101 may transfer the NEF API calls in Non-Access Stratum (NAS) files that traverse a 3GPP N1 link. In some examples, non-3GPP IWF 112 authenticates and authorizes UE 101 for NEF API calls before transferring API calls from UE 101 to 3GPP NEF 113. For example, IWF 112 may compare UE ID hash results from UE 101 with expected UE ID hash results for authentic UE 101. In some examples, non-3GPP IWF 112 transfers the NEF API calls to 3GPP NEF 113 over a wireless network slice and/or Data Network Name (DNN) that is selected for UE 101 and configured to securely transfer NEF API calls from UE 101 to 3GPP NEF 113.

Advantageously, UE 101 effectively interacts with NEF 113. Moreover, wireless communication network 100 efficiently uses secure network links 121-123 to support interaction between the UE 101 and NEF 113. UE 101 communicates with non-3GPP access node 111 over technologies like Institute of Electrical and Electronic Engineers (IEEE) 802.3 (Ethernet), IEEE 802.11 (WIFI), Bluetooth, or some other data communication protocol. UE 101 communicates with non-3GPP IWF 112 over non-3GPP access node 111 using technologies like Internet Protocol (IP) and 5G core signaling. Communication links 121-125 use metallic wiring, glass fibers, radio channels, or some other communication media. The data links use Ethernet, Time Division Multiplex (TDM), Data Over Cable System Interface Specification (DOCSIS), WIFI, IP, General Packet Radio Service Transfer Protocol (GTP), WIFI, virtual switching, interprocessor communication, bus interfaces, and/or some other data communication protocols. UE 101, access node 111, IWF 112, NEF 113, and AF 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
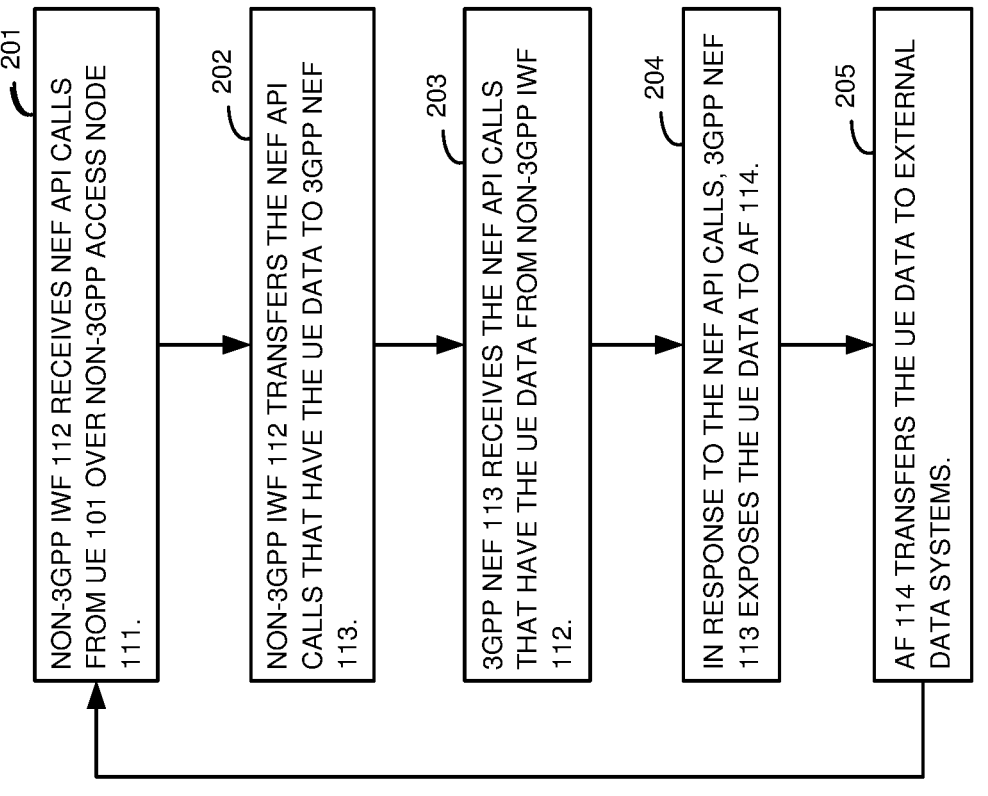
FIG. 2 illustrates an exemplary operation of the wireless communication network to serve the UEs over the 3GPP NEF.

FIG. 2 illustrates an exemplary operation of wireless communication network 100 to serve UE 101 over 3GPP NEF 113. The operation may differ in other examples. Non-3GPP IWF 112 receives NEF API calls from UE 101 over non-3GPP AN 111 (201). Non-3GPP IWF 112 transfers the NEF API calls that have the UE data to 3GPP NEF 113 (202). 3GPP NEF 113 receives the NEF API calls that have the UE data from non-3GPP IWF 112 (203). In response to the NEF API calls, 3GPP NEF 113 exposes the UE data to AF 114 (204). AF 114 transfers the UE data to external data systems (205). The operation repeats (201).

Figure 3:
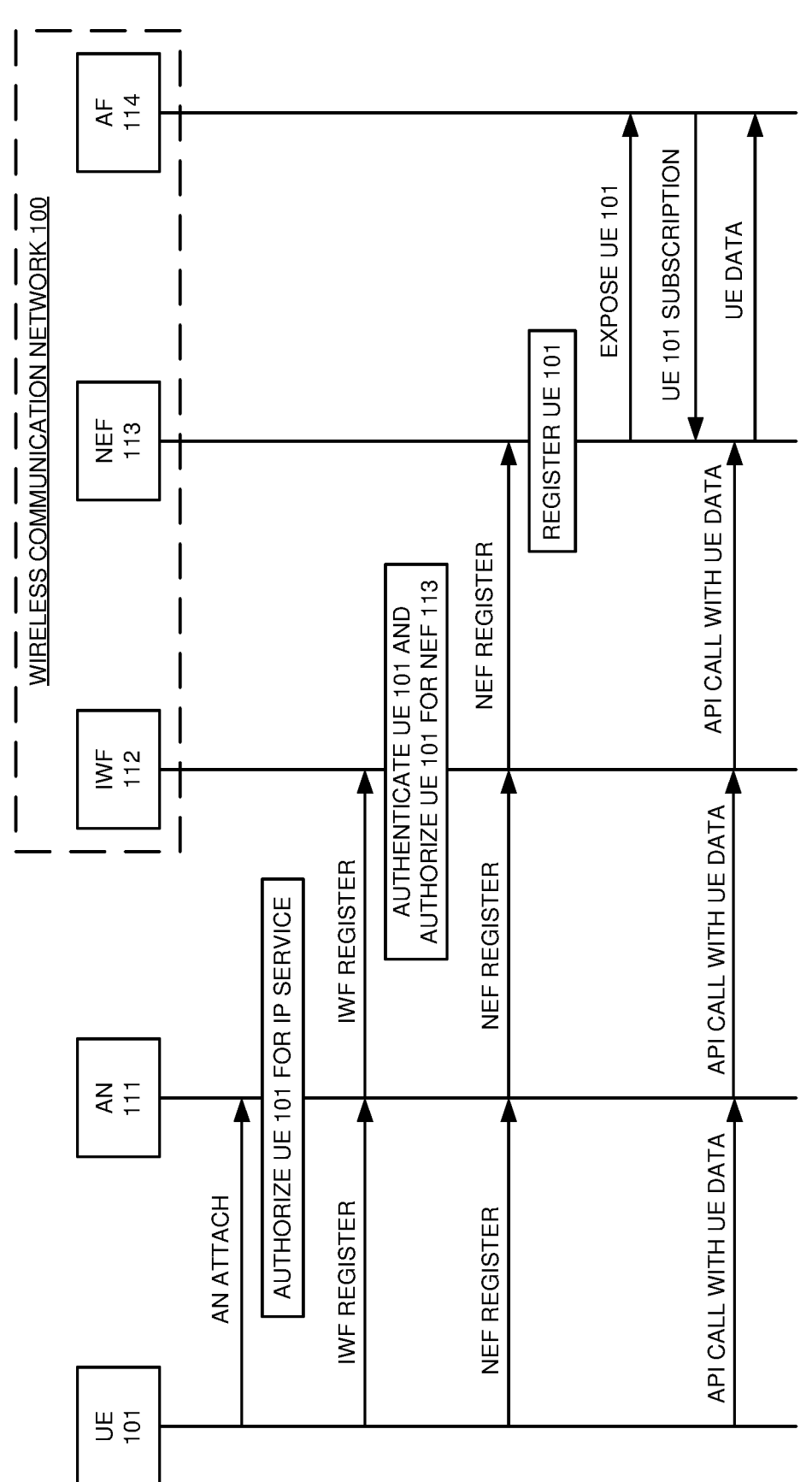
FIG. 3 illustrates an exemplary operation of the wireless communication network to serve the UEs over the 3GPP NEF.

FIG. 3 illustrates an exemplary operation of wireless communication network 100 to serve UE 101 over 3GPP NEF 113. The operation may differ in other examples. UE 101 attaches to non-3GPP AN 111. UE 101 registers with non-3GPP IWF 112 over non-3GPP AN 111. Non-3GPP IWF 112 authenticates and authorizes UE 101 for NEF 113—perhaps with the support of an AMF other network function. UE 101 registers with 3GPP NEF 113 over AN 111 and IWF 112. 3GPP NEF 113 registers UE 101 for NEF service.

In response to the NEF registration by UE 101, 3GPP NEF 113 exposes UE 101 to AF 114, and AF 114 subscribes to UE 101 data. UE 101 generates and transfers NEF API calls that have UE data to non-3GPP IWF 112 over non-3GPP AN 111. Non-3GPP IWF 112 receives the NEF API calls from UE 101 over non-3GPP AN 111. Non-3GPP IWF 112 transfers the NEF API calls that have the UE data to 3GPP NEF 113. 3GPP NEF 113 receives the NEF API calls that have the UE data from non-3GPP IWF 112. In response to the NEF API calls, 3GPP NEF 113 exposes the UE data to AF 114. AF 114 may transfer the UE data to external data systems.

Figure 4:
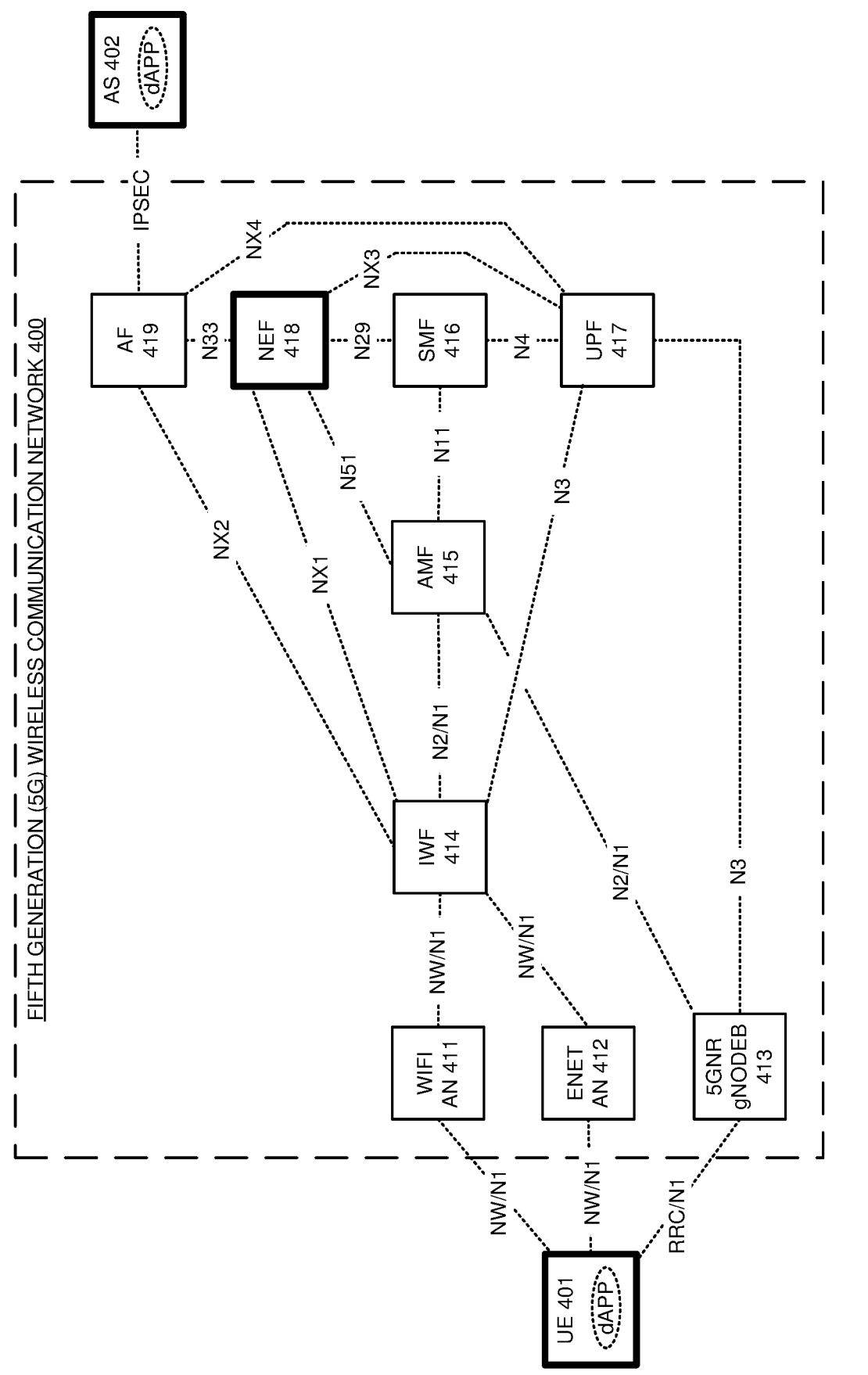
FIG. 4 illustrates a Fifth Generation (5G) wireless communication network to serve UEs over a 3GPP NEF.

FIG. 4 illustrates Fifth Generation (5G) wireless communication network 400 to serve UE 401 over 3GPP NEF 418. 5G wireless communication network 400 comprises an example of wireless communication network 100, although network 100 may differ. 5G wireless communication network 400 comprises: UE 401, WIFI Access Node (AN) 411, Ethernet (ENET) AN 412, 5GNR gNodeB 413, non-3GPP Interworking Function (IWF) 414, 3GPP Access and Mobility Management Function (AMF) 415, 3GPP Session Management Function (SMF) 416, 3GPP User Plane Function (UPF) 417, 3GPP NEF 418, and 3GPP Application Function (AF) 419.

UE 401 and Application Server (AS) 402 execute a distributed application (dAPP). UE 401 is linked to ANs 411-412 and gNodeB 413. AS 402 is linked to AF 419. UE 401 executes the dApp to generate and transfer NEF Application Programming Interface (API) calls that have UE data. The NEF API calls may be standard calls for UE 401 and/or other UEs like: UE monitoring, device triggering, background data transfer, parameter provisioning, packet flow description management, traffic influence, chargeable party control, and NEF session quality. The NEF API calls may be non-standard calls for UE 401 and/or the other UEs like dApp transactions between UE 401 and AS 402 through NEF 418 and AF 419.

UE 401 transfers the NEF API calls for delivery to NEF 418. Multiple API paths are available:

UE 401-AN 411/412-IWF 414-NEF 418,

UE 401-AN 411/412-IWF 414-AF 419-NEF 418,

UE 401-AN 411/412-IWF 414-UPF 417-NEF 418,

UE 401-AN 411/412-IWF 414-UPF 417-AF 419-NEF 418,

UE 401-AN 411/412-IWF 414-AMF 415-NEF 418,

UE 401-AN 411/412-IWF 414-AMF 415-SMF 416-NEF 418,

UE 401-gNodeB 413-AMF 415-NEF 418,

UE 401-gNodeB 413-AMF 415-SMF 416-NEF 418,

UE 401-gNodeB 413-UPF 417-NEF 418, and

UE 401-gNodeB 413-UPF 417-AF 419-NEF 418.

When AMF 414 and/or SMF 416 are used, UE 401 may transfer the NEF API calls in Non-Access Stratum (NAS) files that traverse the 3GPP N1 link between UE 401 and AMF/SMF 414-415.

At least one of network functions 414-419 authenticates the identity of UE 401 and authorizes UE 401 for NEF API service. For example, AMF 415 may authenticate the identity of UE 401 through the exchange of random numbers and hash results. AMF 415 may select a Data Network Name (DNN) that includes SMF 416 and NEF 418 and/or a wireless network slice that includes UPF 417 and AF 419. In response to the NEF API calls, 3GPP NEF 418 may expose the UE data to AF 419, and AF 419 may transfer the UE data to AS 402 over a secure link like IPSEC.

Figure 5:
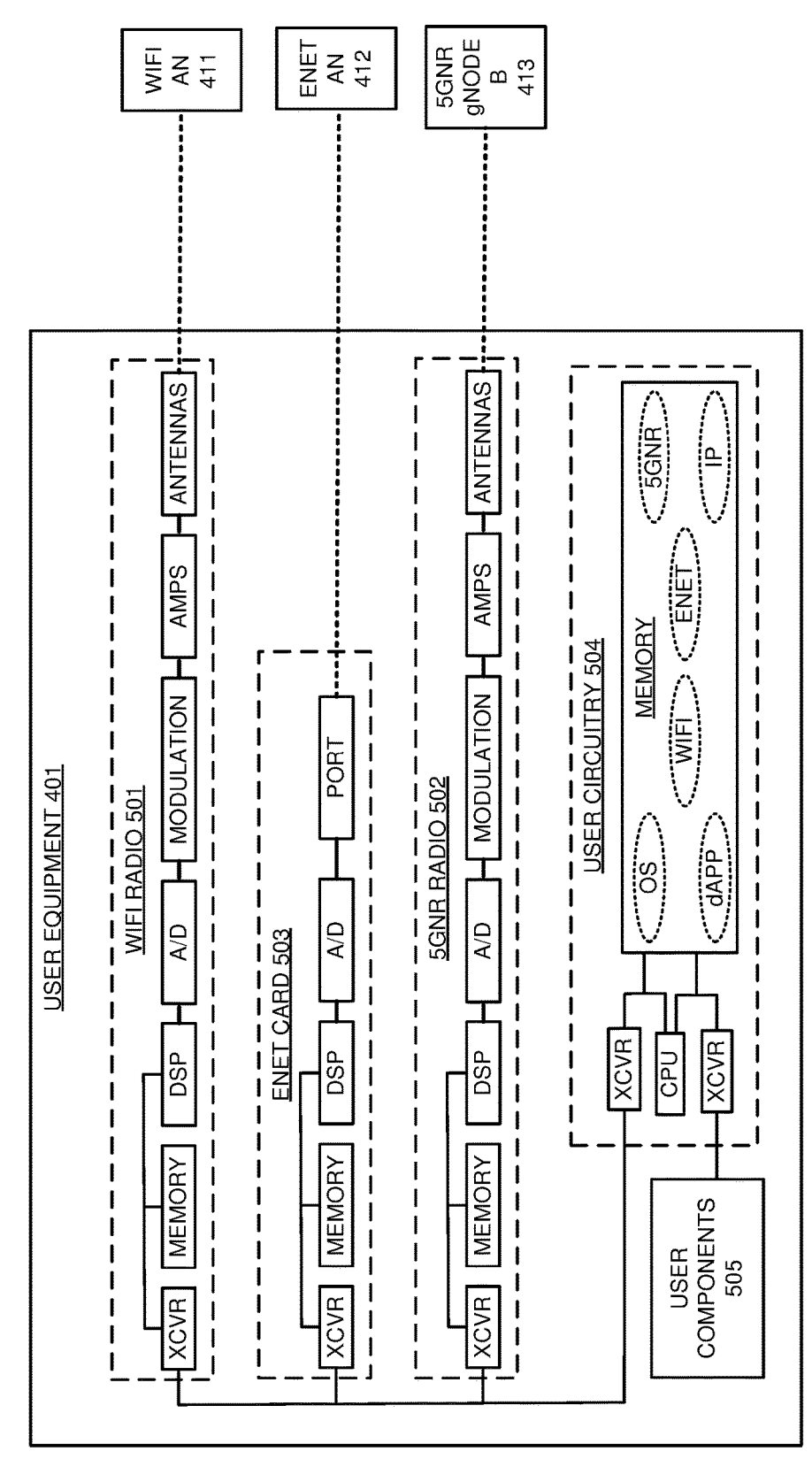
FIG. 5 illustrates a UE in the 5G wireless communication network.

FIG. 5 illustrates UE 401 in 5G wireless communication network 400. UE 401 comprises an example of UE 101, although UE 101 may differ. UE 401 comprises WIFI radio 501, 5GNR radio 502, Ethernet (ENET) card 503, user circuitry 504, and user components 505. Radios 501-502 comprises antennas, amplifiers, filters, modulation, analog-to-digital interfaces, DSP, memory, and transceivers that are coupled over bus circuitry. Ethernet card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, dAPP, and network applications for WIFI, ENET, 5GNR, and IP. The network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in WIFI radio 501 are wirelessly coupled to WIFI AN 411 over a WIFI link. The antennas in 5GNR radio 502 are wirelessly coupled to 5GNR gNodeB 413 over a 5GNR link. The port in ENET card 503 is wireline coupled to ENET AN 412 over an Ethernet link. Transceivers (XCVRs) in radios 501-502 and card 503 are coupled to transceivers in user circuitry 504. Transceivers in user circuitry 504 are coupled to user components 505 like displays, controllers, interfaces, and memory. The CPU in user circuitry 504 executes the operating system, dAPP, and network applications to exchange network signaling and user data with: WIFI AN 411 over WIFI radio 501, ENET AN 412 over ENET card 503, and 5GNR gNodeB 413 over 5GNR radio 502. In particular the dAPP transfers NEF API calls to NEF 418. In some examples, some of the WIFI, ENET, and 5GNR components could be omitted. UE 401 could be a WIFI-only device, WIFI/ENET device, 5GNR/WIFI device, or use some other technology combination device.

Figure 6:
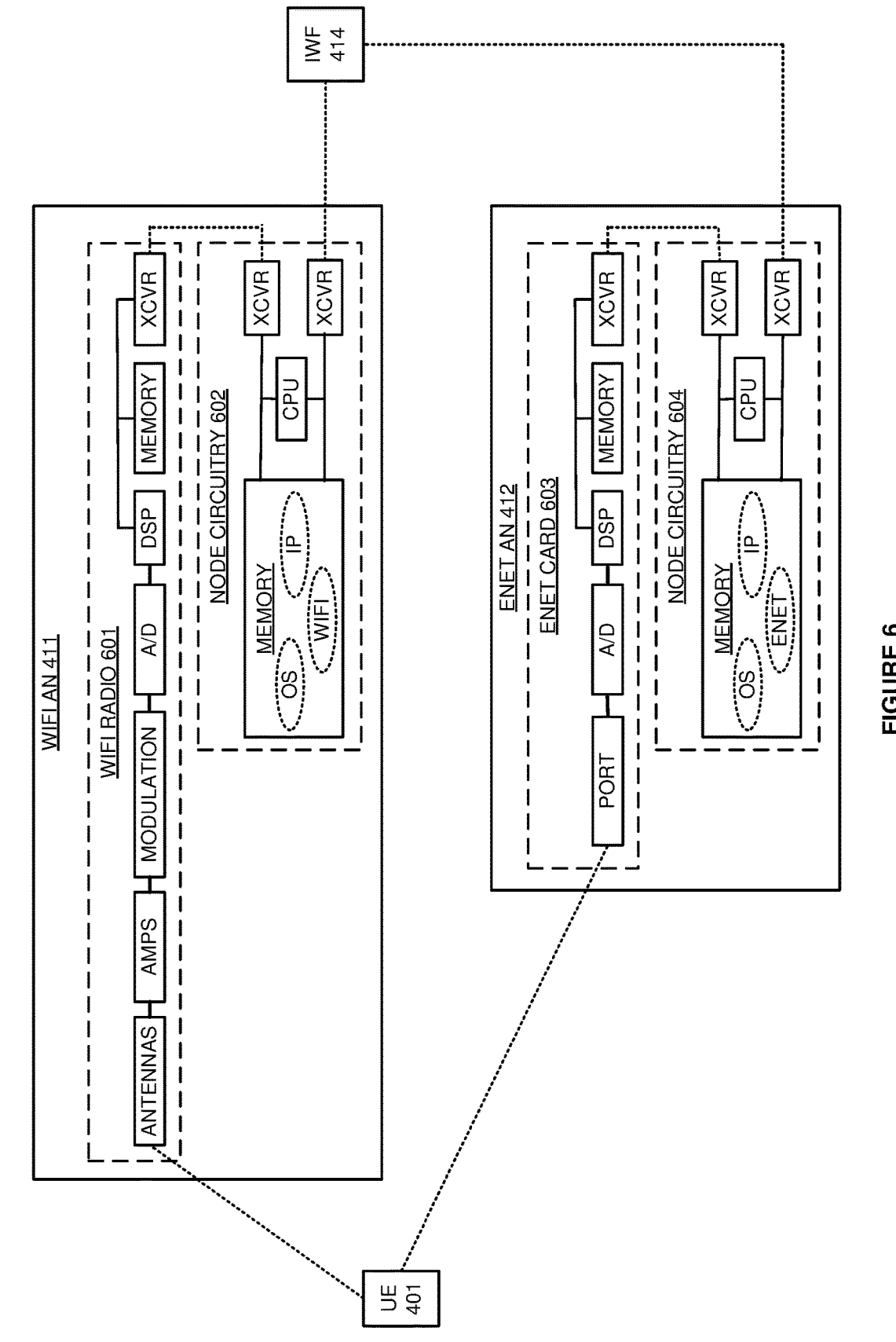
FIG. 6 illustrates non-3GPP access nodes in the 5G wireless communication network.

FIG. 6 illustrates non-3GPP ANs 411-412 in 5G wireless communication network 400. Non-3GPP access nodes 411-412 comprises an example of access nodes 111-112 although access nodes 111-112 may differ. WIFI AN 411 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system, user applications, and network applications for IP and WIFI. The antennas in WIFI radio 601 are wirelessly coupled to UE 401 over a WIFI link. Transceivers in WIFI radio 601 are coupled to transceivers in node circuitry 602. Transceivers in node circuitry 602 are coupled to transceivers in IWF 414. The CPU in node circuitry 602 executes the operating systems, user applications, and network applications to exchange network signaling and user data with UE 401 and with IWF 414.

ENET AN 412 comprises ENET card 603 and node circuitry 604. ENET card 603 comprises ports, analog-to-digital interfaces, DSP, memory, and transceivers that are coupled over bus circuitry. Node circuitry 604 comprises memory, CPU, user interfaces and components, and transceivers that are coupled over bus circuitry. The memory in node circuitry 604 stores an operating system, user applications, and network applications for IP and ENET. The ports in ENET card 603 are wireline coupled to UE 401 over an ENET link. Transceivers in ENET card 603 are coupled to transceivers in node circuitry 604. Transceivers in node circuitry 604 are coupled to transceivers in IWF 414. The CPU in node circuitry 604 executes the operating systems, user applications, and network applications to exchange network signaling and user data with UE 401 and with IWF 414.

Figure 7:
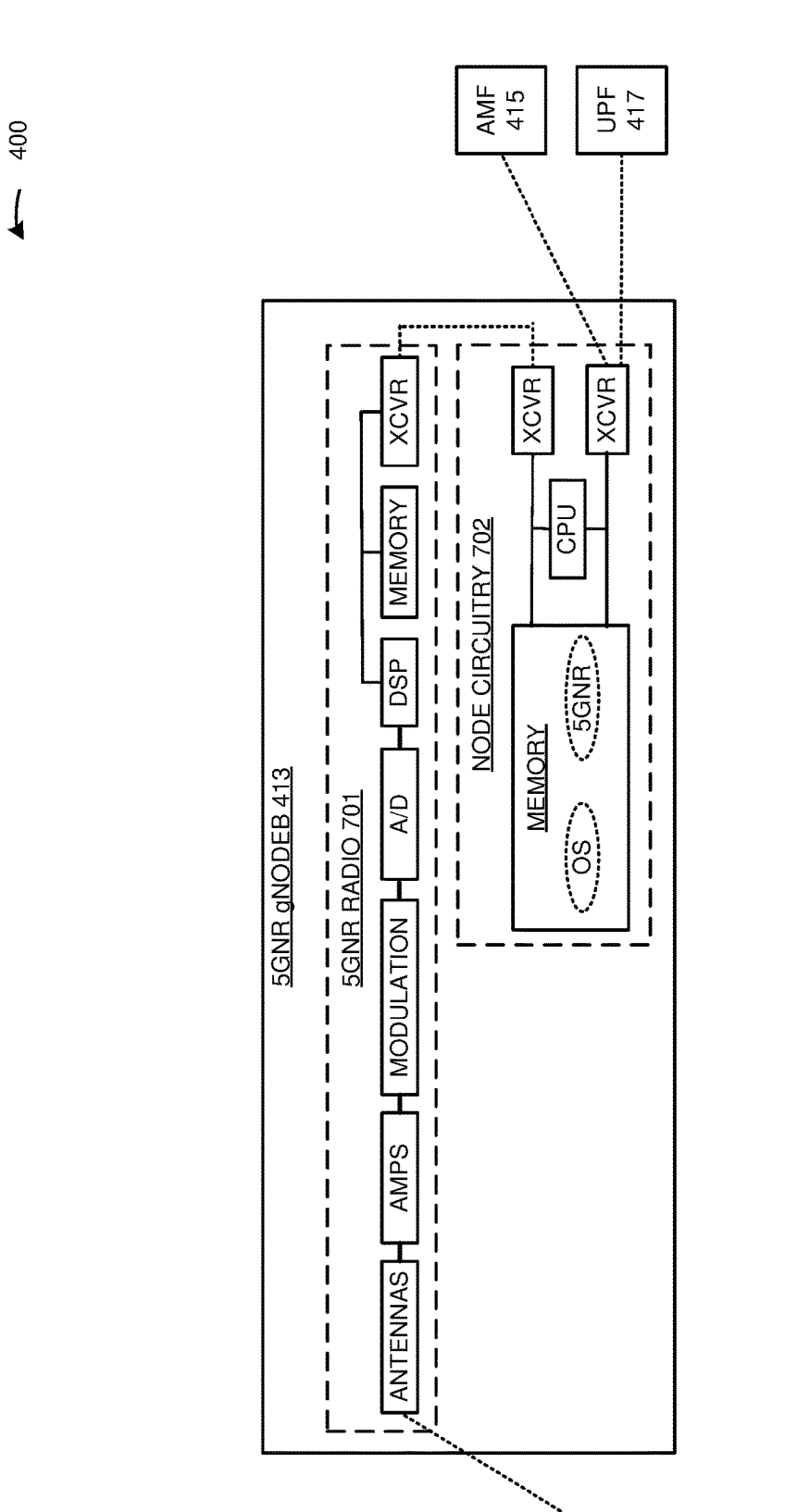
FIG. 7 illustrates a 5G New Radio (5GNR) gNodeB in the 5G wireless communication network.

FIG. 7 illustrates 5G New Radio (5GNR) gNodeB 413 in 5G wireless communication network 400. 5GNR gNodeB 413 comprises 5GNR radio 701 and node circuitry 702. 5GNR radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system, user applications, and network applications for IP and 5GNR. The antennas in 5GNR radio 701 are wirelessly coupled to UE 401 over a 5GNR link. Transceivers in 5GNR radio 701 are coupled to transceivers in node circuitry 702. Transceivers in node circuitry 702 are coupled to transceivers in AMF 415 and UPF 417. The CPU in node circuitry 702 executes the operating systems, user applications, and network applications to exchange network signaling and user data with UE 401, AMF 415 and UPF 417.

Figure 8:
FIG. 8 illustrates a wireless network core in the 5G wireless communication network.

FIG. 8 illustrates wireless network core 800 in 5G wireless communication network 400. Wireless network core 800 comprises an example of wireless communication network 100, although network 100 may differ. Wireless network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise IWF 814, AMF 815, SMF 816, UPF 817, NEF 818, and AF 819. Other VNFs like Authentication Server Function (AUSF) and Network Repository Function (NRF) are typically present but are omitted for clarity. Wireless network core 800 may be located at a single site or be distributed across multiple geographic locations. The NIC transceivers in NFVI hardware 801 are coupled to WIFI AN 411, ENET AN 412, 5GNR gNodeB 413, and AS 402. NFVI hardware 801 executes NFVI hardware drivers 802, NFVI operating systems 803, NFVI virtual layer 804, and NFVI VNFs 805 to form and operate IWF 414, AMF 415, SMF 416, UPF 417, NEF 418, and AF 419.

Figure 9:
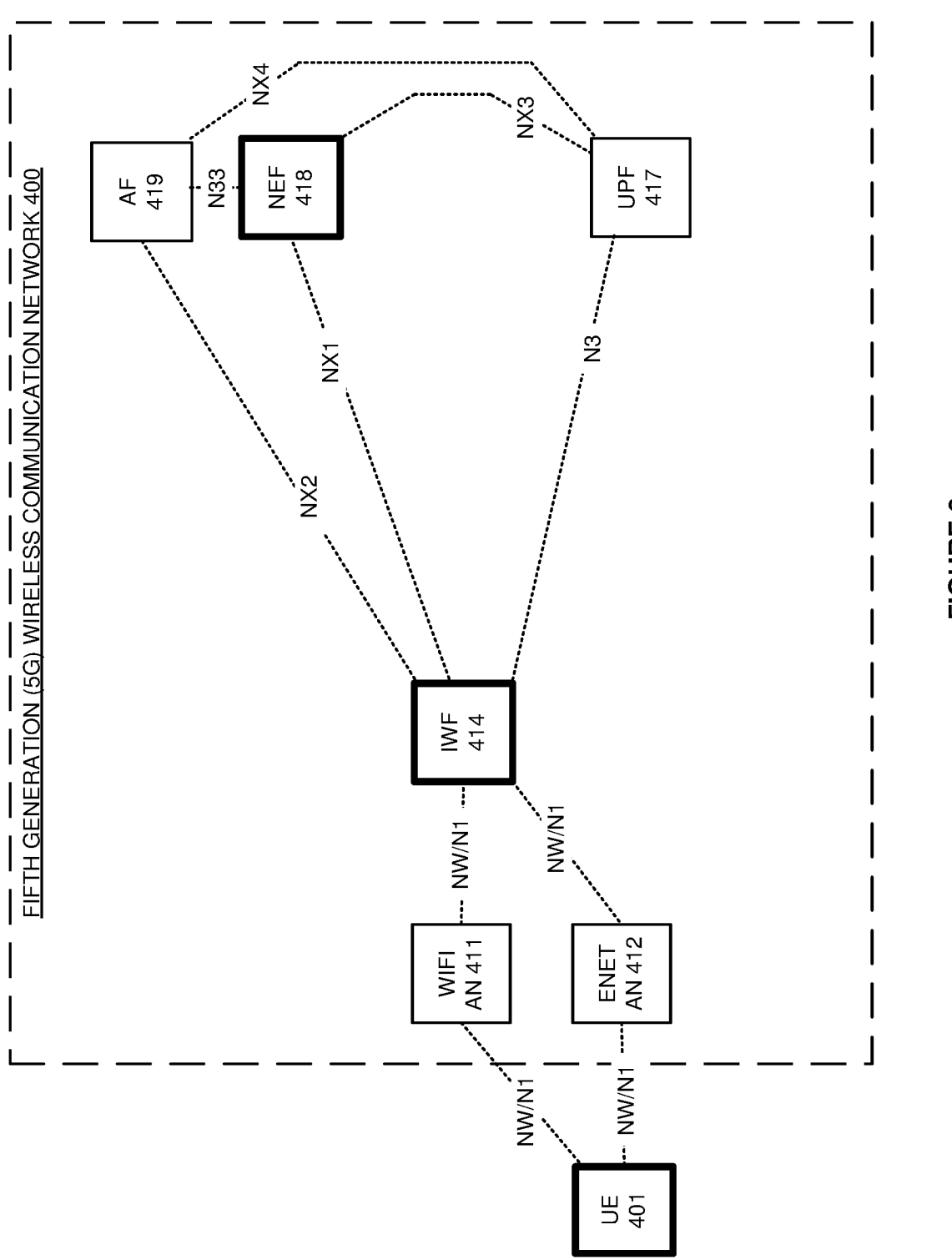
FIG. 9 illustrates an exemplary operation of the 5G wireless communication network to serve the UEs over the 3GPP NEF.

FIG. 9 illustrates an exemplary operation of 5G wireless communication network 400 to serve UE 401 over 3GPP NEF 418. The operation may differ in other examples. UE 401 generates NEF API calls that have UE data. In this example, UE 401 transfers the NEF API calls to NEF 418 over IWF 414. The following paths are available:

UE 401-AN 411/412-IWF 414-NEF 418,
UE 401-AN 411/412-IWF 414-AF 419-NEF 418,
UE 401-AN 411/412-IWF 414-UPF 417-NEF 418, and
UE 401-AN 411/412-IWF 414-UPF 417-AF 419-NEF 418.

IWF 414 may interwork the API calls between NW and NX1—where NX1 represents a suitable reference point for IWF-NEF communications. IWF 414 may interwork the API calls between NW and NX2—where NX2 represents a suitable reference point for IWF-AF communications. AF 419 may interwork the API calls between NX2 and N33. UPF 417 may interwork the API calls between N3 and NX3, where NX3 is a suitable reference point for UPF-NEF communications. UPF 417 may interwork the API calls between N3 and NX4, where NX4 is a suitable reference point for UPF-AF communications.

IWF 414 authenticates the identity of UE 401 and authorizes UE 401 for NEF API service-typically with the support of AMF 415 or a Unified Data Management (UDM). IWF 414 may select a Data Network Name (DNN) that includes NEF 418 and/or a wireless network slice that includes UPF 417 and AF 419-typically with the support of AMF 415, UDM, or a Network Slice Selection Function (NSSF).

Figure 10:
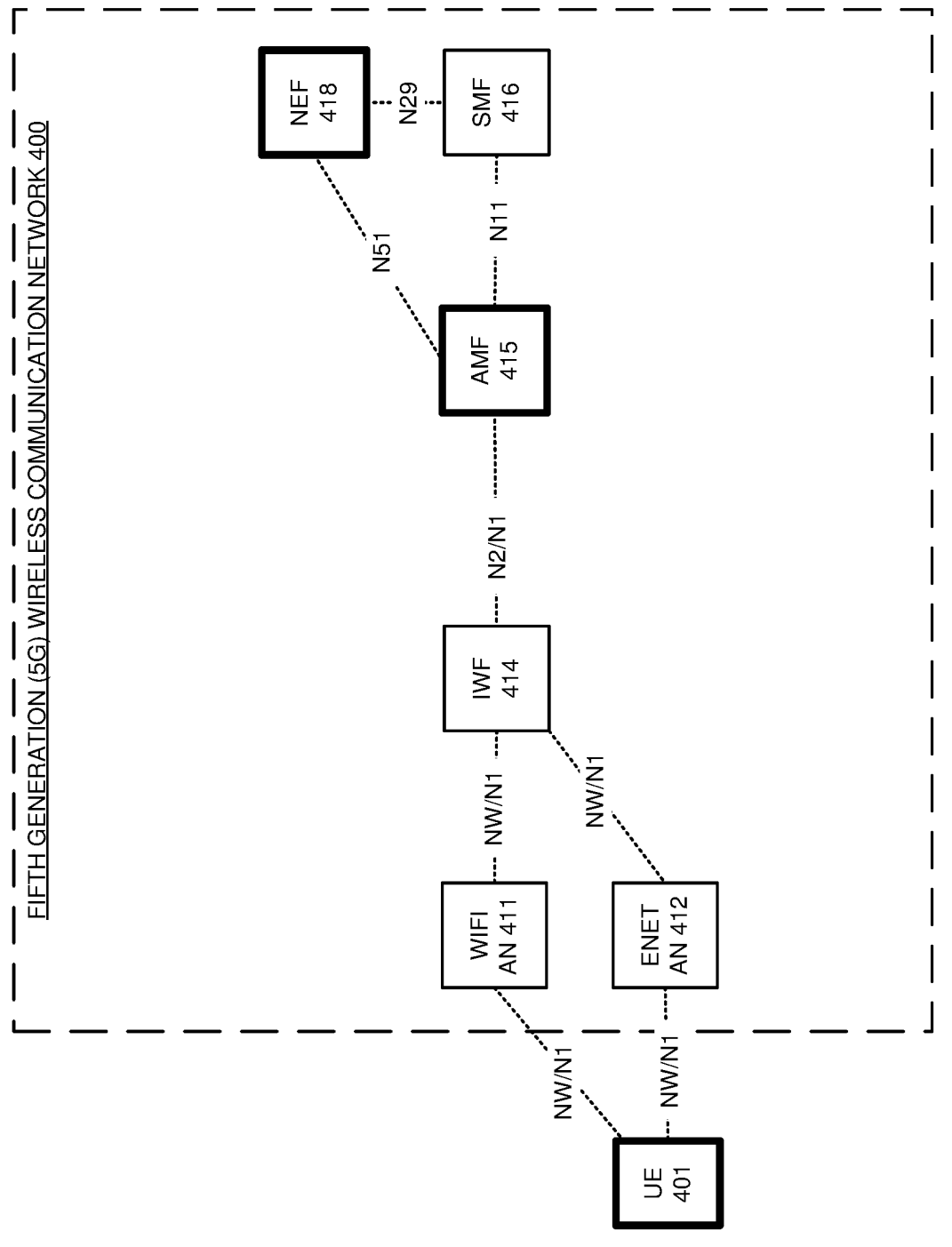
FIG. 10 illustrates an exemplary operation of the 5G wireless communication network to serve the UEs over the 3GPP NEF.

FIG. 10 illustrates an exemplary operation of 5G wireless communication network 400 to serve UE 401 over 3GPP NEF 418. The operation may differ in other examples. In this example, UE 401 transfers the NEF API calls to NEF 418 over both IWF 414 and AMF 415.

The following paths are available:
UE 401-AN 411/412-IWF 414-AMF 415-NEF 418, and
UE 401-AN 411/412-IWF 414-AMF 415-SMF 416-NEF 418.

AMF 415 may interwork the API calls between N1 and N51. AMF 415 may interwork the API calls between N1 and N11, and SMF 416 may interwork the API calls between N11 and N29. UE 401 may transfer the NEF API calls in Non-Access Stratum (NAS) files that traverse the 3GPP N1 link between UE 401 and AMF/SMF 414-415. AMF 415 authenticates the identity of UE 401 and authorizes UE 401 for the API service—typically with the support of a UDM. AMF 415 may select a DNN that includes SMF 415 and NEF 418.

Figure 11:
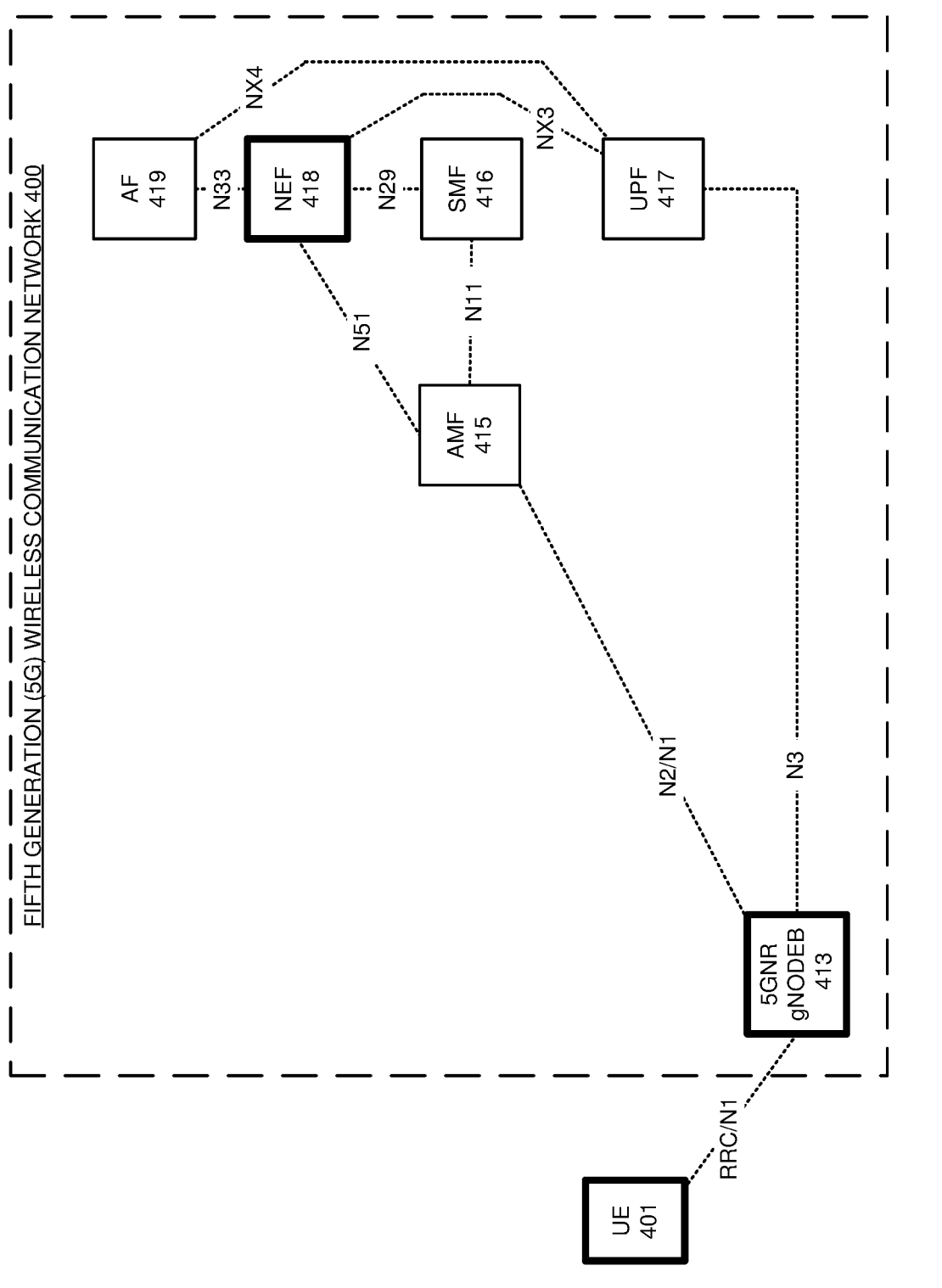
FIG. 11 illustrates an exemplary operation of the 5G wireless communication network to serve the UEs over the 3GPP NEF.

FIG. 11 illustrates an exemplary operation of 5G wireless communication network 400 to serve UE 401 over 3GPP NEF 418. The operation may differ in other examples. In this example, UE 401 transfers the NEF API calls to NEF 418 over 5GNR gNodeB 413. The following paths are available.

UE 401-gNodeB 413-UPF 417-NEF 418,
UE 401-gNodeB 413-UPF 417-AF 419-NEF 418,
UE 401-gNodeB 413-AMF 415-NEF 418, and
UE 401-gNodeB 413-AMF 415-SMF 416-NEF 418.

5GNR gNodeB 513 may interwork the API calls between RRC and N3. UPF 417 may interwork the API calls between N3 and NX3, where NX3 is a suitable reference point for UPF-NEF communications. UPF 417 may interwork the API calls between N3 and NX4, where NX4 is a suitable reference point for UPF-AF communications. AMF 415 may interwork the API calls between N1 and N51. AMF 415 may interwork the API calls between N1 and N11, and SMF 416 may interwork the API calls between N11 and N29.

UE 401 may transfer the NEF API calls in NAS files that traverse the 3GPP N1 link between UE 401 and AMF/SMF 414-415. AMF 415 authenticates the identity of UE 401 and authorizes UE 401 for the API service-typically with the support of a UDM. AMF 415 may select a DNN that includes SMF 416 and NEF 418 and/or wireless network slice that includes UPF 417 and AF 419.

The wireless data network circuitry described above comprises computer hardware and software that form special-purpose networking circuitry to serve UEs over NEFS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve to serve UEs over NEFS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method comprising:
receiving, by a Network Exposure Function (NEF), a request transferred by an Application Server (AS) over an Application Function (AF) for user data from a user communication device associated with the AS in response to exposing, by the NEF, an authentication indication for the user communication device to the AS over the AF;

receiving, by a network function, the user data from the user communication device;

transferring, by the network function, the user data to the NEF;

transferring, by the NEF, the user data to the AF for delivery to the AS; and transferring, by the AF, the user data to the AS.

2. The method of claim 1 wherein receiving, by the network function, the user data from the user communication device comprises receiving, by the network function, a Non-Access Stratum (NAS) file.

3. The method of claim 1 wherein receiving, by the network function, the user data from the user communication device comprises receiving, by the network function, the user data over a Third Generation Partnership Project (3GPP) N1 link.

4. The method of claim 1 wherein receiving, by the network function, the user data from the user communication device and transferring, by the network function, the user data to the NEF comprises receiving, by an Access and Mobility Management Function (AMF), the user data and transferring, by the AMF, the user data to the NEF.

5. The method of claim 1 wherein receiving, by the network function, the user data from the user communication device and transferring, by the network function, the user data to the NEF comprises receiving, by a Non-Third Generation Partnership Project Interworking Function (N3IWF), the user data and transferring, by the N3IWF, the user data to the NEF.

6. The method of claim 1 wherein receiving, by the network function, the user data from the user communication device and transferring, by the network function, the user data to the NEF comprises receiving, by a User Plane Function (UPF), the user data and transferring, by the UPF, the user data to the NEF.

7. The method of claim 1 wherein receiving, by the network function, the user data from the user communication device and transferring, by the network function, the user data to the NEF comprises receiving, by a wireless network slice, the user data and transferring, by the wireless network slice, the user data to the NEF.

8. A method comprising:

authenticating, by an Access and Mobility Management Function (AMF), a User Equipment (UE);

transferring, by the AMF, an authentication indication for the authenticated UE to a Network Exposure Function (NEF);

exposing, by the NEF, the authentication indication for the authenticated UE to an Application Function (AF) for delivery to an Application Server (AS) associated with the authenticated UE in response to the authentication;

transferring, by the AF, the authentication indication to the AS;

receiving, by the NEF, a request transferred by the AS over the AF for user data from the authenticated UE in response to the exposure;

receiving, by the NEF, the user data from the authenticated UE;

transferring, by the NEF, the user data to the AF for delivery to the AS in response to the request; and transferring, by the AF, the user data to the AS.

9. The method of claim 8 wherein receiving, by the NEF, the request transferred by the AS over the AF for the user data from the authenticated UE comprises receiving, by the NEF, an Application Programming Interface (API) call for the user data transferred by the AS over the AF.

10. The method of claim 8 wherein receiving, by the NEF, the user data from the authenticated UE comprises receiving, by the NEF, an Application Programming Interface (API) call that comprises the user data from the authenticated UE.

11. The method of claim 8 wherein receiving, by the NEF, the user data from the authenticated UE comprises receiving, by the NEF, an Application Programming Interface (API) call that comprises the user data from a Non-Third Generation Partnership Project Interworking Function (N3IWF).

12. The method of claim 8 wherein authenticating, by the AMF, the UE and receiving, by the NEF, the user data from the authenticated UE comprises authenticating, by the AMF, the UE and receiving, by the NEF, the user data from the authenticated UE over a WiFi access node.

13. The method of claim 8 wherein authenticating, by the AMF, the UE and receiving, by the NEF, the user data from the authenticated UE comprises authenticating, by the AMF, the UE and receiving, by the NEF, the user data from the authenticated UE over an ethernet access node.

14. The method of claim 8 wherein receiving, by the NEF, the user data from the authenticated UE and transferring, by the NEF, the user data to the AF for delivery to the AS comprises receiving, by the NEF in a wireless network slice, the user data and transferring, by the NEF in the wireless network slice, the user data to the AF for delivery to the AS.

15. A data communication system comprising:

Network Exposure Function (NEF) circuitry configured to expose an authentication indication for a user communication device associated with an Application Server (AS) to the AS over Application Function (AF) circuitry and receive a request transferred by the AS over the AF for user data from the user communication device in response to the exposure;

Access and Mobility Management Function (AMF) circuitry configured to receive the user data from the user communication device;

the AMF circuitry further configured to transfer the user data to the NEF circuitry;

the NEF circuitry further configured to transfer the user data to the AF circuitry for delivery to the AS; and the AF circuitry configured to transfer the user data to the AS.

16. The data communication system of claim 15 wherein the AMF circuitry is further configured to receive the user data from the user communication device in a Non-Access Stratum (NAS) file.

17. The data communication system of claim 15 wherein the AMF circuitry is further configured to receive the user data from the user communication device over a Third Generation Partnership Project (3GPP) N1 link.

18. The data communication system of claim 15 wherein the AMF circuitry is further configured to receive the user data from the user communication device over Non-Third Generation Partnership Project Interworking Function (N3IWF) circuitry.

19. The data communication system of claim 15 wherein the AMF circuitry is further configured to receive the user data from the user communication device via one or more of a Fifth Generation (5G) gNodeB, an ethernet access node, or a WiFi access node.

20. The data communication system of claim 15 wherein the AMF circuitry is further configured to authenticate the user communication device.

* * * * *